(12) United States Patent
Gasser et al.

(10) Patent No.: US 7,757,123 B1
(45) Date of Patent: Jul. 13, 2010

(54) MANAGING FAULTS

(75) Inventors: Morrie Gasser, Hopkinton, MA (US); Mark W. Kulacz, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 702 days.

(21) Appl. No.: 11/477,302

(22) Filed: Jun. 29, 2006

(51) Int. Cl.
*G06F 11/00* (2006.01)
(52) U.S. Cl. .......................................... 714/27; 714/25
(58) Field of Classification Search .................... 714/27
See application file for complete search history.

(56) References Cited

U.S. PATENT DOCUMENTS

| | | | | |
|---|---|---|---|---|
| 4,817,092 A | * | 3/1989 | Denny | 714/10 |
| 4,873,687 A | * | 10/1989 | Breu | 714/4 |
| 4,881,230 A | * | 11/1989 | Clark et al. | 714/712 |
| 5,253,184 A | * | 10/1993 | Kleinschnitz | 702/184 |
| 5,293,556 A | * | 3/1994 | Hill et al. | 702/184 |
| 5,561,760 A | * | 10/1996 | Ferris et al. | 714/25 |
| 6,829,658 B2 | * | 12/2004 | Beauchamp et al. | 710/16 |
| 6,948,090 B2 | * | 9/2005 | King | 714/7 |
| 7,120,559 B1 | * | 10/2006 | Williams et al. | 702/185 |
| 7,131,030 B2 | * | 10/2006 | Gilstrap et al. | 714/25 |
| 7,313,717 B2 | * | 12/2007 | Vecoven et al. | 714/4 |
| 7,574,540 B2 | * | 8/2009 | Robillard et al. | 710/62 |
| 2002/0138782 A1 | * | 9/2002 | Durrant et al. | 714/2 |
| 2007/0073968 A1 | * | 3/2007 | Gasser et al. | 711/114 |
| 2007/0088974 A1 | * | 4/2007 | Chandwani et al. | 714/6 |

* cited by examiner

*Primary Examiner*—Scott T Baderman
*Assistant Examiner*—Kamini Patel
(74) *Attorney, Agent, or Firm*—Krishnendu Gupta; Jason A. Reyes

(57) ABSTRACT

Faults are managed. A problem is detected in a data storage system. Possible field replaceable units (FRUs) of the data storage system are identified that may be at fault for the problem. If only one FRU may be at fault, a definitive alert is issued identifying the FRU. If multiple FRUs may be at fault, fault isolation is executed. If fault isolation isolates the problem to only one FRU, a definitive alert is issued naming the FRU. If fault isolation does not isolate the problem to only one FRU, an ambiguous alert is issued identifying multiple FRUs. The user is directed to execute a troubleshooting tree, which execution includes a manual FRU replacement by the user.

20 Claims, 2 Drawing Sheets

MANAGING FAULTS

INCORPORATION BY REFERENCE

This patent application incorporates by reference the entire subject matter in copending U.S. patent application Ser. No. 11/238,601 filed Sep. 29, 2005 entitled RAID DATA STORAGE SYSTEM WITH SAS EXPANSION, assigned to the same assignee as the present invention.

TECHNICAL FIELD

This invention relates to managing faults.

BACKGROUND

Computers today, such as the personal computers and servers, rely on microprocessors, associated chip sets, and memory chips to perform most of their processing functions. Because these devices are integrated circuits formed on semi-conducting substrates, the technological improvements of these devices have essentially kept pace with one another over the years. In contrast to the dramatic improvements of the processing portions of a computer system, the mass storage portion of a computer system has experienced only modest growth in speed and reliability. As a result, computer systems failed to capitalize fully on the increased speed of the improving processing systems due to the dramatically inferior capabilities of the mass data storage devices coupled to the systems.

While the speed of these mass storage devices, such as magnetic disk drives, has not improved much in recent years, the size of such disk drives has become smaller while maintaining the same or greater storage capacity. Furthermore, such disk drives have become less expensive. To capitalize on these benefits, it was recognized that a high capacity data storage system could be realized by organizing multiple small disk drives into an array of drives. However, it was further recognized that large numbers of smaller disk drives dramatically increased the chance of a disk drive failure which, in turn, increases the risk of data loss. Accordingly, this problem has been addressed by including redundancy in the disk drive arrays so that data lost on any failed disk drive can be reconstructed through the redundant information stored on the other disk drives. This technology has been commonly referred to as "redundant arrays of inexpensive disks" (RAID).

To date, at least five different levels of RAID have been introduced. The first RAID level utilized mirrored devices. In other words, data was written identically to at least two disks. Thus, if one disk failed, the data could be retrieved from one of the other disks. Of course, a level 1 RAID system requires the cost of an additional disk without increasing overall memory capacity in exchange for decreased likelihood of data loss. The second level of RAID introduced an error code correction (ECC) scheme where additional check disks were provided to detect single errors, identify the failed disk, and correct the disk with the error. The third level RAID system utilizes disk drives that can detect their own errors, thus eliminating the many check disks of level 2 RAID. The fourth level of RAID provides for independent reads and writes to each disk which allows parallel input-output operations. Finally, a level 5 RAID system provides memory striping where data and parity information are distributed in some form throughout the memory segments in the array.

The implementation of data redundancy, such as in the RAID schemes discussed above, creates fault tolerant computer systems where the system may still operate without data loss even if one segment or drive fails. This is contrasted to a disk drive array in a non-fault tolerant system where the entire system fails if any one of the segments fail. Of course, it should be appreciated that each RAID scheme necessarily trades some overall storage capacity and additional expense in favor of fault tolerant capability. Thus, RAID systems are primarily found in computers performing relatively critical functions where failures are not easily tolerated. Such functions may include, for example, a network server, a web server, a communication server, etc.

One of the primary advantages of a fault tolerant mass data storage system is that it permits the system to operate even in the presence of errors that would otherwise cause the system to malfunction. As discussed previously, this is particularly important in critical systems where downtime may cause relatively major economic repercussions. However, it should be understood that a RAID system merely permits the computer system to function even though one of the drives is malfunctioning. It does not necessarily permit the computer system to be repaired or upgraded without powering down the system. To address this problem, various schemes have been developed, some related to RAID and some not, which facilitate the removal and/or installation of computer components, such as a faulty disk drive, without powering down the computer system. Such schemes are typically referred to as "hot plug" schemes since the devices may be unplugged from and/or plugged into the system while it is "hot" or operating. These schemes which facilitate the hot-plugging of devices such as memory cartridges or segments, may be implemented through complex logic control schemes.

Although hot plug schemes have been developed for many computer components, including microprocessors, memory chips, and disk drives, most such schemes do not permit the removal and replacement of a faulty device without downgrading system performance to some extent.

As is known in the art, it is sometimes desirable that the data storage capacity of the data storage system be expandable. More particularly, a customer may initially require a particular data storage capacity. As the customer's business expands, it would be desirable to corresponding expand the data storage capacity of the purchased storage system.

Small Computer Systems Interface ("SCSI") is a set of American National Standards Institute ("ANSI") standard electronic interface specification that allow, for example, computers to communicate with peripheral hardware.

SCSI interface transports and commands are used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards.

SUMMARY

Faults are managed. A problem is detected in a data storage system. Possible field replaceable units (FRUs) of the data storage system are identified that may be at fault for the problem. If only one FRU may be at fault, a definitive alert is issued identifying the FRU. If multiple FRUs may be at fault, fault isolation is executed. If fault isolation isolates the problem to only one FRU, a definitive alert is issued naming the FRU. If fault isolation does not isolate the problem to only one FRU, an ambiguous alert is issued identifying multiple FRUs. The user is directed to execute a troubleshooting tree, which execution includes a manual FRU replacement by the user.

One or more embodiments of the invention may provide one or more of the following advantages.

A fault reporting mechanism may be provided that does not need to change as improved fault isolation techniques are added. Decisions about which diagnostics to execute may be made up to the last minute in a project, or improved in future patches over time, without changing any documentation or software other than low level software that performs the diagnostics.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
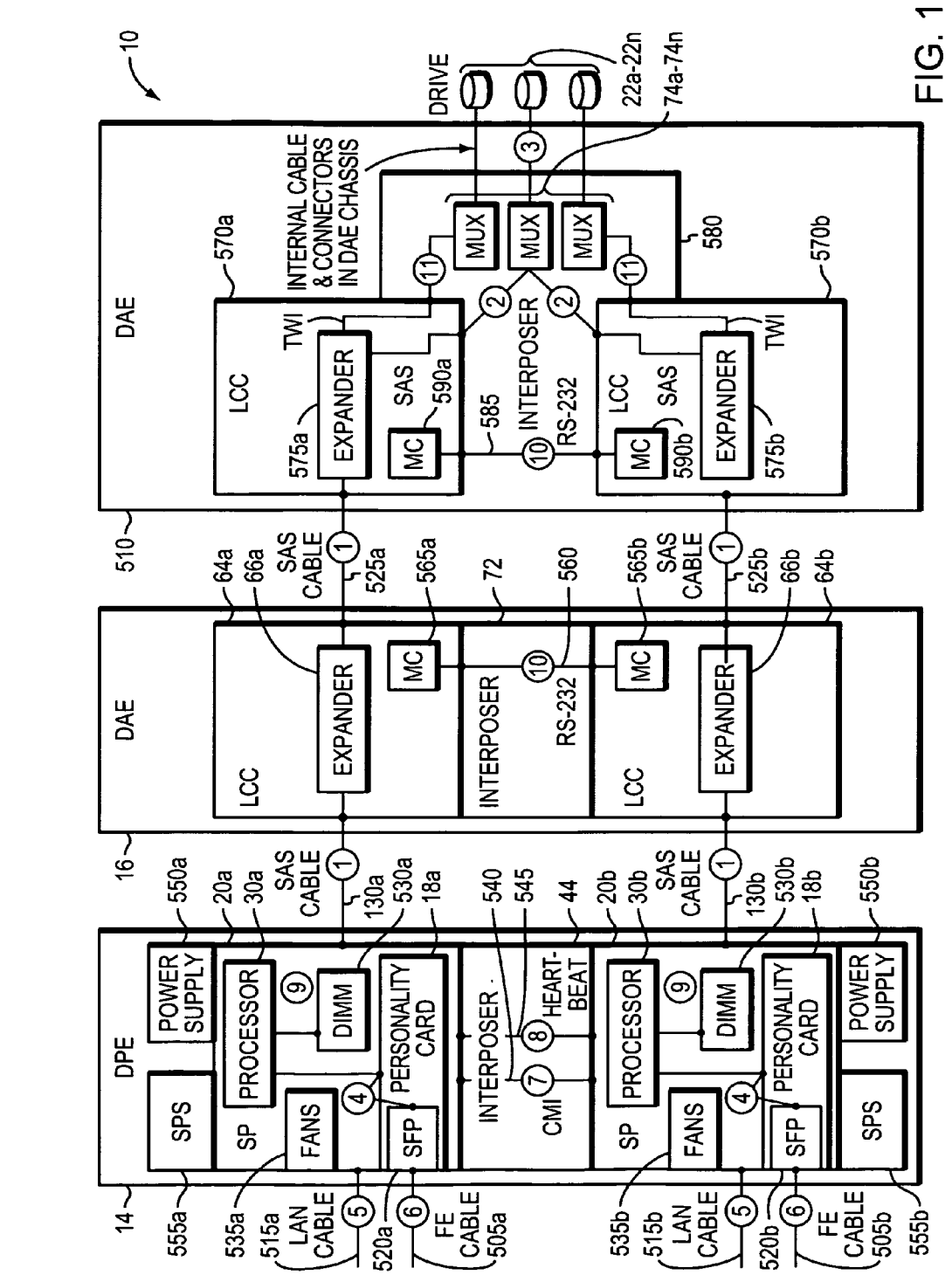
FIG. 1 is a block diagram of a data storage system.

A flexible fault reporting technique is described below. In a system having field replaceable units (FRUs), also referred to as customer replaceable units (CRUs), a key purpose of fault reporting is ultimately for software to detect a hardware problem and inform the user (e.g., an end-user or a service technician) which FRU to replace. There are two kinds of faults that the software reports to the user: definitive and ambiguous.

In the case of a definitive fault, the software determines specifically which FRU needs replacing, identifies the FRU, and directs the user to replace it. No "troubleshooting" is required.

In the case of an ambiguous fault, the software cannot determine which of multiple FRUs might be the cause of a problem, so it reports to the user a list of two or more FRUs (e.g., in order of probability or ease of repair), and the user manually figures out which of the listed FRUs to replace (e.g., by using a troubleshooting tree presented in a set of web pages, by parts swapping, and/or checking LEDs).

In some cases, when software detects from initial symptoms that the system is misbehaving in some way, the software can determine immediately from the initial symptoms which FRU needs replacing, so it issues a definitive fault.

In other cases, however, the initial symptoms alone are not sufficient to identify the FRU that needs replacing and the software needs to run diagnostics or perform other, more complex analysis such as event correlation to determine which FRU needs replacing. Depending on the outcome of the analysis, the software may isolate the FRU and report a definitive fault, or it may report an ambiguous fault if it cannot analyze any further. (In the worst case, the problem is so difficult to diagnose that the problem could be any FRU in the system, and the software reports an ambiguous fault naming every FRU.)

A key aspect of the technique is that, with a comprehensive definition of many or all of the possible ambiguous faults that might be reported, and a definitive fault for each individual FRU, an infrastructure allows fault diagnosis to be gracefully improved over time without changing the infrastructure or fault reporting mechanism. For example, originally diagnosis capability may be less than desired, such that most problems are reported as ambiguous faults, and over time diagnosis capability may improve and enable reporting of more definitive faults and fewer ambiguous faults.

For at least some systems, an initial enumeration of all possible ambiguous faults need not contain every permutation of FRUs. For example, if a system has five FRUs, there are 325 permutations of ambiguous and definitive faults that name 1, 2, 3, 4 or 5 FRUs in a particular order. But it is very possible that it can be determined that many or most of these permutations would never be needed. For example, it may be determined that there is no single point hardware failure for which the software would have to implicate FRU #1 together with FRU #5, or for which the software could not distinguish between a fault in FRU #3 and a fault in FRU #2. In fact, in at least some systems, the only ambiguous permutations are ones involving FRUs that are physically interconnected, because in these cases it is not necessary to determine which of the interconnected FRUs has failed. In such systems, two FRUs that are not physically interconnected and that do not affect each other in any direct way would not ever both be implicated in the same symptom. Taking these considerations into account in the sample system reduces the 325 combinations to a much smaller number such as 15 or 20. It is practical to list 15 or 20 different types of faults and to document troubleshooting trees for the ambiguous ones in advance.

Referring now to FIG. 1, for example, the technique may be used in or with a data storage system 10. System 10 is coupled by a pair of front end (FE) cables 505a, 505b to respective pair of host computer/servers (not shown). System 10 is also coupled by a pair of local area network (LAN) cables 515a, 515b to the respective pair of host computer/servers. The data storage system 10 includes a plurality of, here for example, three chassis or enclosures 14, 16, 510 as shown. Enclosure 14 is sometimes referred to herein as a Disk Processor Enclosure (DPE) and each of enclosures 16, 510 is sometimes referred to herein as a Disk Array Enclosure (DAE). DPE 14 includes a pair of front end controllers (also known as personality cards) 18a, 18b having respective Small Form-factor Pluggable (SFP) ports 520a, 520b coupled to the pair of host computer/servers. The DPE 14 also includes a pair of storage processors 20a, 20b coupled to each other with storage processor 20a being connected to front end controller 18a and storage processor 20b being connected to front end controller 18b, as shown.

The storage processors 20a, 20b of DPE 14 are connected to the DAE 16 through a pair of SAS cables 130a, 130b, respectively, as shown, and through DAE 16 to DAE 510 through a pair of SAS cables 525a, 525b, respectively, as shown. The DAE 510 includes disk drives 22a-22n.

The DPE 14 is shown to include the pair of storage processors 20a, 20b, each disposed on a corresponding one of a pair of printed circuit boards. Each one of the printed circuit boards has disposed thereon: a processor 30a or 30b, DIMM memory 530a or 530b, and fans 535a or 535b.

The DPE 14 also includes an interposer printed circuit board 44 interconnecting the storage processors with a CMI signal 540 and a heartbeat signal 545, and a pair of power supplies 550a, 550b, and a pair of standby power supplies (SPSs) 555a, 555b.

DAE 16 is shown to include a pair of SAS expander printed circuit boards (also known as link controller cards or LCCs) 64a, 64b, and a pair of SAS expanders 66a, 66b, each one being disposed on a corresponding one of the pair of SAS expander printed circuit boards 64a, 64b.

Also included in DAE 16 is an interposer printed circuit board 72 bearing an RS232 signal 560 between LCCs 64*a*, 64*b*. DAE 16 includes a pair of management controllers 565*a*, 565*b*, each one being disposed on a corresponding one of the pair of expander printed circuit boards.

DAE 510 is shown to include a pair of LCCs 570*a*, 570*b*, and a pair of SAS expanders 575*a*, 575*b*, each one being disposed on a corresponding one of the pair of LCCs 570*a*, 570*b*.

Also included in DAE 510 is an interposer printed circuit board 580 bearing an RS232 signal 585 between LCCs 570*a*, 570*b*. DAE 510 includes a pair of management controllers 590*a*, 590*b*, each one being disposed on a corresponding one of the pair of LCCs 570*a*, 570*b*.

A plurality of multiplexers 74*a*-74*n* is disposed on the interposer printed circuit board 72, each one of the plurality of multiplexers 74*a*-74*n* being connected to SAS expander 575*a* and to SAS expander 575*b*. The DAE 510 includes, as noted above, the plurality of disk drives 22*a*-22*n*, each one being coupled to one of the plurality of multiplexers 74*a*-74*n*.

In at least one implementation, DPE 14 may have up to 12 disk drives, and each one the DAEs 16, 510 may have up to 12 disk drives each, and two more DAEs having up to 12 disk drives each may be added in a chain from DAE 510, to provide data storage system 10 with up to 60 disk drives. The connections between enclosures use standard SAS signals and cables.

At least the following components of system 10 may serve as FRUs: cables 505*a*, 505*b*, 515*a*, 515*b*, 130*a*, 130*b*, 525*a*, 525*b*, DPE 14, DAEs 16, 510, storage processors 20*a*, 20*b*, fans 535*a*, 535*b*, memories 530*a*, 530*b*, personality cards 18*a*, 18*b*, SFPs 520*a*, 520*b*, power supplies 550*a*, 550*b*, SPSs 555*a*, 555*b*, LCCs 64*a*, 64*b*, 570*a*, 570*b*, interposer boards 44, 72, 580, and drives 22*a*-22*n*.

A goal of fault handling is, for all cases in which data storage system 10 does not behave as the user or software expects due to a single hardware fault, the software automatically detects the misbehavior and reports it to the user. In particular as described above, software identifies the single FRU that contains the faulted component, or lists candidate FRUs with guidance that allows the user to isolate the problem to a single FRU.

Fault of an FRU means either a physical failure of the FRU, or removal, improper insertion, or improper connection of the FRU. It includes actions by the user that might manifest as a failed FRU. For example, if the user removes LCC 64*a*, which is an FRU, this is considered a fault in that FRU. It is not assumed that an FRU that appears removed was intentionally removed by the user, because in many or most cases software cannot to determine the difference between total failure of an FRU and intentional removal of the FRU. Also included in the definition are cases of wiring errors in which user has made wrong connections. Examples are cross-wiring an enclosure to itself (in a loop or to its peer), connecting too many enclosures to the data storage system, or connecting to an enclosure already in use by another data storage system.

In at some implementations it is useful to identify only those faults that can be fixed by replacing (or properly inserting) an FRU, and not to allow software or firmware bugs to masquerade as hardware problems such that the user might replace an FRU that is not a failed FRU. Accordingly in such implementations, isolation procedures for at least some faults that could be caused by bugs in software or firmware include a step to reset the FRU running the firmware. If a reset fixes the problem, a firmware bug is presumed the cause and the problem is event logged log instead of reporting the FRU as failed. The purpose of the reset is not to fix the problem, but to ascertain whether it is a hardware problem. In some (e.g., rare) cases a physical failure might also be fixed by a reset. In both cases, if the fix is permanent or long lived, logging is sufficient. If the failure returns frequently, the problem may not be detected unless the log is examined. In at least some implementations, no mechanism is provided for automatically detecting frequent failures because user intervention is not clearly pertinent. Since it may be difficult or impossible to determine whether a recurring problem fixed by a reset is caused by a firmware or hardware, the problem may be considered outside the scope of equipment that the user can service.

In addition, it can be useful to report only root cause faults, by not reporting faults that are side effects of other faults. (This does not mean the user might not be informed about these side effects in some manner.)

With respect to the goal noted above, "automatically" means that software must detect the problem without user intervention. In at least some implementations there is no provision for user-initiated actions to inform software that something is wrong or to run diagnostics. In other implementations service tools may be provided to do so.

Again with respect to the goal noted above, "behave as . . . expects" means that the technique applies only when faults affect "normal" operations or high availability (HA). This includes loss of one of the redundant paths to or storage for some data, inability to perform an operation, presentation of misleading information to the user, or performing an operation with some undesirable side effect such as poor performance. In at least some implementations, faults are not detected unless and until they have one of the above effects, and there is no requirement for software to proactively run tests or look for problems prior to or outside of normal operations. Therefore, if an FRU has failed but HA is not in jeopardy, the failure may not be detected until that FRU is used in some normal operation. In at least some cases, in practical system operation, almost all faults have an immediate affect on HA, and the remaining faults put system 10 in a state in which a second fault or subsequent action could affect HA. Thus these remaining faults might not be detected until the second fault or subsequent action.

The technique does not preclude software from performing proactive tests where appropriate, and any existing operating system functionality to seek out failed components prior to their effect on operations or HA may be preserved. In at least some implementations, the results of routine health monitoring and probing (e.g., sniffer, LCC status polling, periodically checking error counters) can be used and relied upon.

Again with respect to the goal noted above, "guidance" means troubleshooting trees or other written instructions (online or printed) for isolating failed FRUs manually.

In at least some practical applications it may not be possible for the goal to be achieved entirely: software cannot always determine whether system 10 is behaving as the user expects (e.g., the user may have misconfigured it or the problem may be outside the system), and completely checking all operating system unexpected errors for hardware causes may not be achievable. However, it can be particularly useful for the system not to behave in a highly inconvenient manner (e.g., a system panic) due to a hardware fault without the user being able to determine the FRU that caused it.

As noted above, for cases of a single FRU failure in which software cannot automatically detect that system 10 is misbehaving, the user or separate tools are relied upon to detect the problem, and the user may be directed to appropriate troubleshooting trees. An example is loss of a front end port that would only be detected by a host-based HA validation tool.

Figure 2:
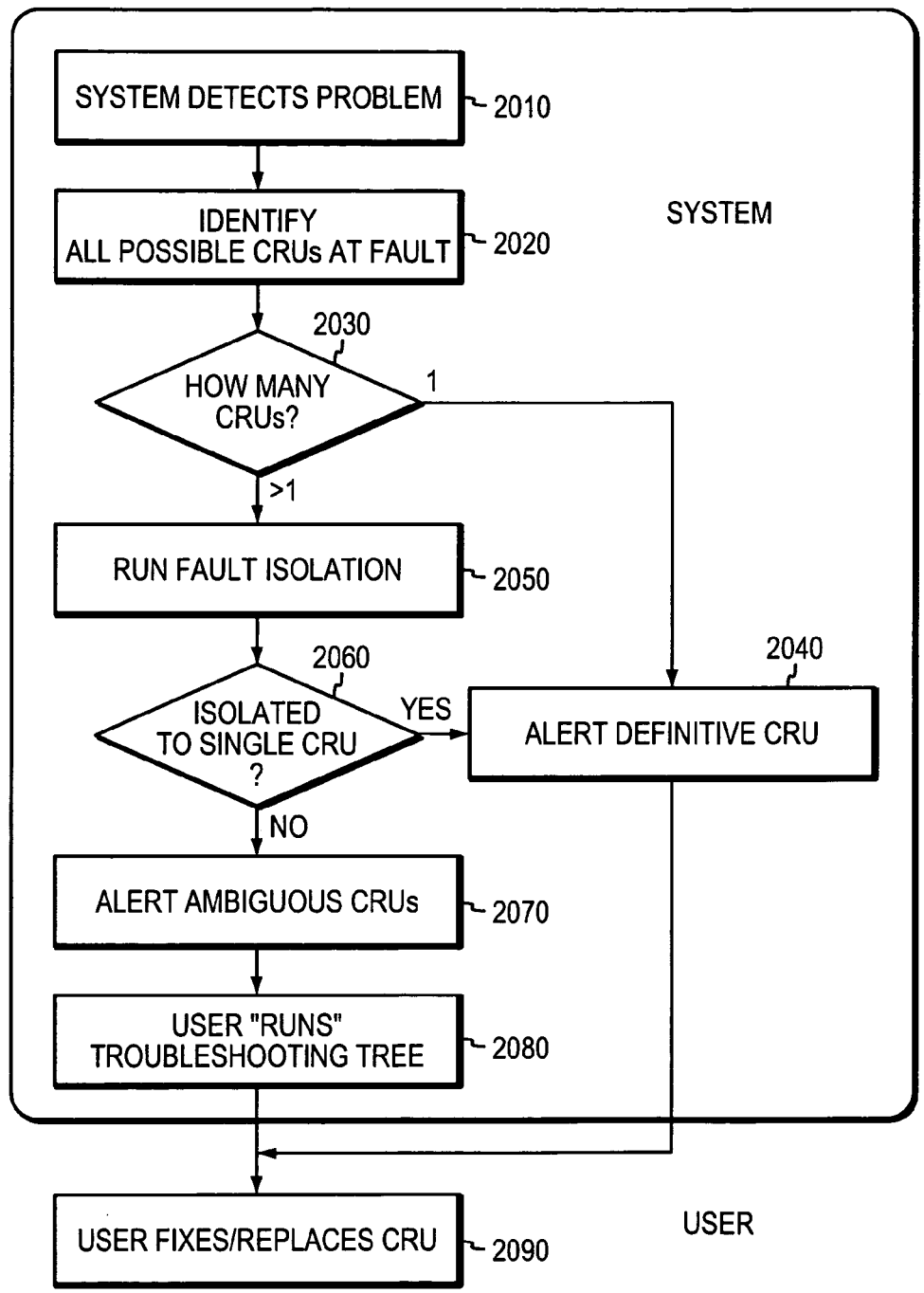
FIG. 2 is a flow diagram of a procedure that may be used with the data storage system of FIG. 1.

FIG. 2 illustrates an overview of failure handling in accordance with the technique, which failure handling includes a fault identification and repair process that involves steps by both the user and the software. In at least some implementations, failure handling always begins with system 10 detecting a problem (step 2010), either through an error code, routine health check, or unexpected behavior, and ends with the user fixing or replacing a failed FRU (step 2090). No user input is required or permitted to start at least some versions of this process.

In particular, the technique may proceed as follows between detection and fixing or replacing. All possible FRUs that may be at fault are identified (step 2020). If only one FRU may be at fault (step 2030), a definitive alert is issued for that FRU (step 2040). Otherwise, fault isolation is executed (step 2050), and if the problem has been isolated to a single FRU (step 2060), a definitive alert is issued for that FRU (step 2040). Otherwise, an ambiguous alert is issued identifying multiple FRUs (step 2070), and the user executes a troubleshooting tree (step 2080).

The user first learns of the problem through one of two types of alerts:

Definitive—software identifies a specific FRU that has failed with near 100% certainty.

Ambiguous—software identifies multiple FRUs, one of which has failed (i.e., it is near 100% certain that exactly one of these FRUs has failed). Software and troubleshooting trees are used to attempt to prioritize the identified FRUs taking into account probability of failure and ease of repair (e.g., to list the most likely culprit FRU first).

In at least some implementations, software must provide a definitive alert whenever possible. In definitive cases the user need only repair (i.e., reseat, insert, or replace) the identified FRU. But in cases in which software cannot make a determination with near 100% accuracy, the alert is ambiguous and provides a list of multiple FRUs. In ambiguous cases the user manually finishes the fault isolation that the software could not complete; the user follows a troubleshooting tree to identify a single failed FRU among the candidate FRUs named in the alert.

"Near 100%" accuracy does not necessarily mean with absolute certainty. In some cases the software can be absolutely certain, such as when an FRU or its component fails its own internal self test, or when a disk reports a media error. But in general this is only a very high probability assessment, where the probability of some other component being the culprit is several orders of magnitude less.

In at least some implementations, the technique covers only single points of failure. Fault isolation suffices in most cases of multiple unrelated failures, but it is possible as described below to make a wrong determination in the face of multiple related failures.

For definitive failures, software may report the failed FRU via:

a. Management software and alert plus email, identifying the FRU by name b. A lit fault LED on the FRU or the nearest associated or parent FRU c. A lit fault LED on the enclosure containing or associated with the FRU For ambiguous failures, software and documentation help guide the user to finish the job of fault isolation. The software:

a. Identifies a set of possible FRUs by name, ordered by probability b. Reports the set of FRUs to the user via alert and email c. Provides the user with a link to a troubleshooting tree that helps the user isolate the failed component with 100% certainty d. Lights the fault LED on enclosure associated with the most probable FRU e. Lights the fault LED on most probable FRU or nearest parent With respect to repair procedures in at least some implementations, the final step to after fault isolation and detection (i.e., after a definitive alert or an ambiguous alert followed by the user's execution of a troubleshooting tree) is for the user to fix the FRU. For the fix, the definitive alert or troubleshooting tree points the user to repair instructions for the FRU. In at least some cases, these instructions simply explain how to replace the FRU—no additional troubleshooting is necessary once the FRU is identified.

However in some cases the repair may not require replacing the FRU—the part may have been inserted improperly and needs to be reseated, or maybe it was not inserted at all. Therefore it may be appropriate for repair procedures to contain a troubleshooting tree of sorts, even after the FRU is isolated with 100% certainty, to help the user fix the problem without requiring a new part. It is also possible that fixing the problem might be accomplished by a reset or power cycle, but these will generally be ruled out by fault isolation software that includes steps to reset parts. It may be possible to avoid these cases by implementing the necessary resets in software and firmware during software fault isolation.

The steps of reseating or inserting an FRU may be included as final steps in the troubleshooting tree for the ambiguous alert, and possibly in a definitive alert, which may not refer to a troubleshooting tree.

In some cases the troubleshooting tree may require trying several FRU replacements in order to isolate the failed one. This is usually done as a last resort when the problem cannot be isolated with the FRUs in place. It may also require swapping existing FRUs, and contain steps to reset/reseat FRUs. In those cases the user may need to refer to repair instructions in order to find the FRUs and implement the troubleshooting steps.

With respect to multiple failures and degraded modes, as stated above, in at least some implementations all fault isolation behavior assumes that only a single point of failure. If more than one FRU has failed, or if multiple components (e.g., chips and etch) within an FRU have failed, behavior with respect to failure reporting is undefined. As a result of the complexity, it is not certain that the technique will identify any one or all of the failed FRUs. However, reasonable care may be taken in implementation to avoid erroneous behavior in the face of multiple failures, and in some cases to detect them as separate failures.

For at least some applications of the technique, since the definition of "fault" includes removal of an FRU or its component, at the instant a problem is detected that is caused by failure of an FRU, all other FRUs in the system must be otherwise perfectly healthy and configured normally. That is, all cables must be plugged in and all LCCs and SPs must be powered up and operating normally (other than the one failed FRU). In other words, fault isolation is not assured if any part of system 10 is already running in a degraded mode when a failure occurs.

In practice, a second fault unrelated to an existing fault is likely to be handled properly because troubleshooting two random failures is not likely involve the same sets of FRUs. Fault isolation code requires the help of FRUs other than the ones implicated by the failure and therefore assumes that those other FRUs are running normally. If software detects that an ancillary failure is preventing proper fault isolation, it will give up and ultimately report the failure to the user in a generic way, naming multiple possible FRUs, possibly with no help guiding the user to the correct FRU. Or it may not even detect the ancillary failure and report erroneous results.

It is expected that in at least some cases of multiple related failures that occur at runtime, the first two failures occur far enough apart in time so that the fault isolation, alerts, and troubleshooting trees accurately identify the first failure to the user before the second fault occurs. Without special provisions, this does not hold true if two failures occur while the system is powered off. For example, the first failure may be the user's forgetting to plug in a cable while the system is powered off, which leaves the system in degraded mode upon power up (and since this is a fault, the user is alerted to this). But if a second component suffers a failure immediately upon power up, the system never has a chance to alert the user to the first failure, and the two failures at power up may prevent fault isolation for either failure.

Also, depending on the implementation, if the user does not notice the first fault or forgets about it, the alert for the first fault may disappear if a second fault occurs that obscures the first one, since alerts may be visible only while the software actively observes the problem. However, in these cases the user can review the event log or past email messages to see past alerts. Troubleshooting the first alert may no longer be possible after the second failure, but the email message may provide some hint or guidance regarding FRUs to suspect.

With respect to FRUs and fault points, FIG. 1 shows the FRUs in system 10 as described above. Numbered circles indicate interfaces between pairs of FRUs where special fault isolation logic is needed to distinguish between the two linked FRUs. In the case in which a passive etch or cable on one FRU links two active FRUs (e.g., numbered circle 7 indicating CMI signal 540), fault isolation usually needs to take into account the two active FRUs plus the FRU containing the link (e.g., for numbered circle 7, FRUs 20a, 20b, 44. FIG. 1 does not illustrate several other minor links between FRUs where fault isolation may be appropriate (e.g., SP-SPS, MC-Interposer resume vital product data EEPROM). Depending on the implementation, in those cases a failure almost always implicates a CRU directly rather than triggering fault isolation, even if this could be erroneous.

In at least some (e.g., nearly all) cases in which software detects a fault within a single FRU as an unexpected error or by a builtin self test, it can immediately issue a definitive alert implicating the correct FRU. But if software detects a problem that could be caused by one of several FRUs, it must run fault isolation, which is a more complex process that attempts to isolate the failed part at each interface between the candidate FRUs. As noted above, these interfaces are highlighted with numbered circles in FIG. 1. The goal of software fault isolation is to narrow down the list of candidate FRUs. If it is narrowed down to one FRU, software can issue a definitive alert. Otherwise it issues an ambiguous alert identifying the remaining candidate FRUs.

FRUs may contain active and/or passive components, and in at least some implementations most failures are confined to active components or the connections between them. When an FRU contains only a passive link (e.g., a copper etch, cable, or connector) between two active FRUs inside the enclosure, fault isolation may assume that the passive link is not at fault and may not try to isolate the failure to the passive link, since etches and internal connectors rarely fail if nothing has changed in the system. For example, if expander 575a receives an indication from its MC 590a that the peer MC 590b is not responding, but both MCs 590a, 590b are reporting good status to their respective expanders, this may be due to failure of one of the MCs, an etch or a connector on either LCC 570a or 570b, or the MC-MC link 585 on the interposer 580 or its connectors to the LCCs (the interface indicated by numbered circle 10 in FIG. 1). In this case fault isolation may assume that the interposer and its connectors are not at fault and may consider running fault isolation only between the MCs. If after such fault isolation the MCs appear not at fault, but the problem is still conceivably with one of the MCs, an ambiguous alert may be generated naming both LCCs and, as a last resort, the interposer containing the etch.

In at least some implementations there is generally have no way of implicating passive links alone as the cause of any problem, so a definitive alert would never be created for the interposer in the example above. However, where fault isolation is thorough enough to rule out the active components with a very high degree of confidence, the ambiguous alert may elevate the priority of the FRU containing the link as the problem.

An inability to implicate passive links with certainty may also pertain to external cables and connectors. Accordingly, in such implementations, fault isolation should never result in a definitive alert naming a cable. However, in many cases external cables are much less reliable than internal board-to-board connectors, mostly because they are more likely to become unplugged or improperly seated. Also, in system 10, a catastrophic problem, such as loss of power to the board such that it might not be possible to run any fault isolation at all, is more likely to be caused by a failure of an internal connector than by a fault in an external cable that would affect only data transfer. As a result, if fault isolation is in the form of loop-back tests which can do an effective job of ruling out active components on the ends of the cable, so that the software can be "near 100% certain" that the problem is with the cable, a definitive alert may be issued for the cable alone.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in managing faults, comprising:
detecting a problem in a data storage system, wherein the data storage system comprises a first enclosure having a pair of front end controllers and a pair of storage processors, a second enclosure having a plurality of disk drives, the second enclosure connected to the first enclosure, and a third enclosure having a pair of link controller cards, the third enclosure connected to the second enclosure;
identifying possible field replaceable units (FRUs) of the data storage system that may be at fault for the problem, wherein the possible FRUs are present in at least one of the first, second, and third enclosures;
if only one FRU may be at fault, issuing a definitive alert identifying the FRU;
if multiple FRUs may be at fault, executing fault isolation;
if fault isolation isolates the problem to only one FRU, issuing a definitive alert naming the FRU;
if fault isolation does not isolate the problem to only one FRU, issuing an ambiguous alert identifying multiple FRUs; and
directing the user to execute a troubleshooting tree, which execution includes a manual FRU replacement by the user.

2. The method of claim 1, further comprising:
creating a comprehensive definition of ambiguous faults that might be reported in the data storage system.

3. The method of claim 1, further comprising:
using an improved diagnosis capability to report a definitive fault instead of an ambiguous fault.

4. The method of claim 1, wherein the only ambiguous faults that are used involve FRUs that are physically interconnected.

5. The method of claim 1, wherein the problem is due to a physical failure of an FRU.

6. The method of claim 1, wherein the problem is due to an actions by the user that manifests as a failed FRU.

7. The method of claim 1, further comprising:
identifying only those faults that can be fixed by replacing an FRU.

8. The method of claim 1, further comprising:
if a reset fixes the problem, event logging the problem instead of reporting the FRU as failed.

9. The method of claim 1, further comprising:
reporting only root cause faults.

10. The method of claim 1, further comprising:
detecting the problem without user intervention.

11. The method of claim 1, further comprising:
identifying FRUs only if the problem affects high availability.

12. The method of claim 1, further comprising:
performing proactive tests using and existing operating system functionality to seek out the problem prior to its effect on operations.

13. The method of claim 1, further comprising:
prioritizing the identified FRUs by probability of failure and ease of repair.

14. The method of claim 1, further comprising:
issuing the definitive alert if an FRU fails its own internal self test.

15. The method of claim 1, further comprising:
providing a link to the troubleshooting tree.

16. The method of claim 1, further comprising:
directing the user to swap existing FRUs.

17. The method of claim 1, further comprising:
treating the problem as a single point of failure.

18. The method of claim 1, further comprising:
if an ancillary failure is preventing proper fault isolation, naming multiple possible FRUs.

19. The method of claim 1, further comprising:
allowing the user to review an event log or past email messages to see past alerts.

20. The method of claim 1, further comprising:
directing the fault isolation to active components.

* * * * *